United States Patent [19]

Burmester et al.

[11] Patent Number: 4,666,987

[45] Date of Patent: May 19, 1987

[54] IN-MOLD POLYMERIZATION OF VINYL AROMATIC COMPOUND

[75] Inventors: Alan F. Burmester, Midland, Mich.; John S. Trent, State College, Pa.

[73] Assignee: The Dow Chemical Company, Midland, Mich.

[21] Appl. No.: 704,437

[22] Filed: Feb. 22, 1985

[51] Int. Cl.$^4$ .............................................. C08L 51/06
[52] U.S. Cl. ................................... 525/193; 525/240; 525/241; 525/242; 525/250; 525/322; 525/324; 525/931
[58] Field of Search ............... 525/324, 322, 319, 931, 525/193, 250, 242

[56] References Cited

U.S. PATENT DOCUMENTS

| | | | |
|---|---|---|---|
| 2,482,825 | 9/1949 | Amos et al. | 525/242 |
| 3,636,141 | 1/1972 | O'Neill et al. | 525/193 |
| 3,751,403 | 8/1973 | Hara . | |
| 3,751,524 | 8/1973 | Haigh et al. | 525/193 |
| 3,812,088 | 5/1974 | Bennett . | |
| 3,852,376 | 12/1974 | Bando et al. | 525/319 |
| 3,972,843 | 8/1976 | de Jong | 525/319 |
| 4,153,647 | 5/1979 | Glukhovskoi et al. | 525/250 |
| 4,218,203 | 8/1980 | Tilgner . | |
| 4,256,679 | 3/1981 | Osinski et al. . | |
| 4,257,992 | 3/1981 | Schulte et al. . | |

FOREIGN PATENT DOCUMENTS 1174845  12/1969  United Kingdom .

OTHER PUBLICATIONS

J. D. Muzzy et al., Preprint 1980 ANTEC Meeting, Soc. Plast. Eng., pp. 638–639.
J. D. Muzzy et al., Preprint of Organic Coatings and Plastics Materials, vol. 44, ACS Meeting, Atlanta, Mar. 1981, 139–144.
J. D. Muzzy et al., Preprint of Organic Coatings and Plastics Materials, vol. 44, ACS Meeting, Atlanta, Mar. 1981, 145–150.

*Primary Examiner*—Wilbert J. Briggs, Sr.
*Attorney, Agent, or Firm*—Douglas Deline

[57] ABSTRACT

A process for in mold polymerization and a composition for use therein comprising a polymerizable vinyl aromatic monomer and a particulated, semicrystalline nonmiscible polymer.

20 Claims, No Drawings

IN-MOLD POLYMERIZATION OF VINYL AROMATIC COMPOUND

BACKGROUND OF THE INVENTION

The present invention relates to a process for polymerizing vinyl aromatic compounds. More particularly, the present invention relates to a process for polymerizing in a mold, i.e., reaction injection molding a fluid vinyl aromatic compound, optionally containing additional components such as crosslinking agents, reinforcing agents, prepolymer and impact modifiers.

It has been previously known to polymerize a vinyl aromatic compound in a mold in order to directly prepare molded compositions. The process is rendered particularly difficult by the fact that pure styrene, when allowed to polymerize adibatically, may achieve excessive temperatures. For example, a temperature rise to an excess of 300° C. is possible. This extreme temperature would be above or at least near the decomposition point of polystyrene. Accordingly, it is necessary in the polymerization of styrene monomer in a mold to resort to methods in order to moderate the release of heat due to polymerization. Suitable means for moderating the increase of temperature include the use of inert diluents in sufficient quantity to moderate the reaction, for example, by absorbing reaction heat via evaporation under reflux. However, in a polymerization in-mold process, the presence of inert diluents may be disadvantageous. The use of such a diluent introduces operational difficulties including the problem of removing residual diluent from the finished polymerized product.

A further disadvantage with in-mold polymerization is caused by the increase in density between polymerized and unpolymerized material resulting in shrinkage of formed parts.

In GB No. 1,174,845, there is disclosed a process employing the use of at least 10 percent by weight of a substantially non-volatile additive which is inert with respect to the polymerization in order that at least a major proportion of the exothermic heat of polymerization may be absorbed within the polymerization mixture. More particularly, the additive employed in the abovedescribed reference includes a polymer having a molecular weight appropriate to the need to dissolve the additive in the vinyl aromatic compound prior to polymerization thereof. Preferably, such polymers were described as polymers of the compound to be polymerized having a weight average molecular weight within the range of 500 to 30,000.

J. D. Muzzy et al. disclosed that in-mold polymerization of styrene using free radical initiators may be achieved in very short reaction times, on the order of about 15 minutes. Crosslinking comonomers were added in order to reduce the amount of unreacted monomer remaining in the product. Fillers, especially prepolymer of the vinyl aromatic compound to be polymerized and foaming agents were also incorporated in order to compensate for the previously discussed polymerization shrinkage and to accommodate the reaction exotherm. See, 1980 ANTEC Meeting, Society of Plastics Engineers, page 638; J. D. Muzzy et al., Preprints of Organic Coating and Plastics Materials, Volume 44, ACS Meeting, Atlanta, March, 1981, page 145.

Previously known processes for preparation of in-mold polymerization products have not proven commercially adaptable. The major problem has continued to be an inability to control the effects of shrinkage while at the same time maintaining adequate control of the heat generated by the polymerizing reaction mixture. Uncontrolled shrinkage results in failure of the molded article to conform adequately to the mold contours resulting in rejected molding parts. Polymerization of a fluid monomer or monomer solution within a mold offers attractive economic advantages over injection molding of a corresponding thermoplastic object. The economic advantage stems from the use of less energy due to the fact that polymerization is accomplished at the time of molding, thereby avoiding the necessity of remelting a thermoplastic polymer prior to injection to a mold. In addition, reduced viscosity of monomers as compared to melted thermoplastics leads to the use of lower pressure processes, especially for the molding of larger parts, thereby resulting in lower energy costs, and the use of molding equipment and molds which need not be built to withstand elevated pressures.

It would be desirable to provide a process for polymerizing a polymerizable reaction mixture in a mold wherein the polymerization mixture is reasonably fluid at or near ambient temperatures. In addition, it would be desirable to provide a process for polymerization in a mold of a reaction mixture whereby the mold may be filled with the polymerization mixture at relatively low pressure. In addition, it would be desirable to provide a polymerization process wherein the exothermic heat of reaction of the polymerization process does not lead to thermal decomposition or excessive pressure within the mold. In addition, it would be desirable to provide a process for polymerization in a mold of a molded object which provides better conformation with the contours of the mold and results in fewer surface defects or cavities in the molded object. In addition, it would be desirable to provide a process for in-mold polymerization of a molded object having improved physical and mechanical properties.

It is the accomplishment of these objects to which the present invention is addressed.

SUMMARY OF THE INVENTION

According to the present invention there is provided an improved process for polymerizing a polymerizable vinyl monomer in a mold meeting some or all of the above objects. In the invention, molded objects are prepared by the polymerization in a mold of a reaction mixture comprising a polymerizable aromatic monomer, and an effective amount to reduce cavity formation due to change in density, of a particulated semicrystalline nonmiscible polymer that is non-reactive in the polymerization process.

DETAILED DESCRIPTION OF THE INVENTION

Vinyl aromatic monomers for use according to the present invention include those vinyl aromatic monomers previously known for use in anionic polymerization processes. Examples include styrene and alkyl or aryl ring-substituted styrenes, such as para-methylstyrene, para-tertiary-butylstyrene, p-phenylstyrene etc. as well as vinyl naphthalenes, alpha alkyl substituted vinyl aromatics such as alpha methylstyrene, and mixtures thereof. A preferred vinyl aromatic monomer is styrene.

Crosslinking agents such as divinyl aromatic compounds, especially divinylbenzene, may also be employed. In a preferred embodiment of the invention, such crosslinking agent is added in an amount from about 1 to about 5 percent by weight. Beneficially the crosslinking agent causes the formation of a gel or crosslink network early in the polymerization giving the object structural integrity prior to density change thereby enabling a molded article to more readily conform to the mold surfaces.

The particulated semicrystalline nonmiscible polymer for use according to the present invention may include any suitable polymer including copolymers or terpolymers not forming an alloy with the vinyl aromatic polymer. Semicrystalline polymers are defined as those polymers possessing a detectable amount of crystallinity by the method of differential scanning calorimetrgy (DSC). Preferred semicrystalline polymers are from about 10 percent to about 90 percent crystalline as measured by the above known technique. Such semicrystalline polymers can absorb relatively large amounts of heat at or near their melting points due to the change in phase thereby aiding in moderating the temperature rise in the polymerization mixture. Most preferred semicrystalline nonmiscible polymers are at least 50 percent crystalline. Particular examples of suitable semicrystalline polymers are polyolefins, such as polyethylene, polypropylene, poly-1-butene, and copolymers such as copolymers of ethylene and α-olefins. A preferred semicrystalline nonmiscible polymer is high density polyethylene.

Unexpectedly, by use of a semicrystalline, nonmiscible polymer or copolymer in highly particulated or comminuted form, cavitation has been discovered to occur in the polymerized object on a microscopic scale, i.e. microcavitation, surrounding the finely divided particles of semicrystalline nonmiscible polymer or copolymer rather than at the mold surface or elsewhere in the object. Because of this phenomenon, the particulated semicrystalline nonmiscible polymers are hereafter interchangeably referred to as microvoid nucleators. Suitable microvoid nucleators are particulated by any suitable means, e.g., formation and subsequent dying of a latex, slurry polymerization, mechanical pulverization by ball mill, grinder, etc., atomization of a melt thereof, and so forth. Preferably, particulated semicrystalline nonmiscible polymers have a number average particle size of less than about 100 micrometers, preferably less than about 75 micrometers. When used herein, the term particle size refers to a particle diameter obtained, for example, by measurement of photomicrographs of the composition. The particulated semicrystalline nonmiscible polymers are preferably those polymers melting at a temperature above about 90° C. Most preferred polymers are those melting at a temperature from about 100° C. to about 160° C.

Often in the practice of the invention it is additionally desirable to provide a miscible polymer. The miscible polymer may be a prepolymerized homopolymer of the monomer being polymerized. Such prepolymerized homopolymer, i.e., prepolymer, is additionally added in order to incorporate improved heat absorption characteristics to the resulting composition as has been previously known in the art. A preferred prepolymer for use in styrene-containing systems is polystyrene. A preferred polystyrene prepolymer has molecular weight from about 500 to about 300,000.

The vinyl aromatic monomers may be polymerized by any suitable technique including free radical or ionic initiated polymerization. A prefered process is anionic polymerization by use especially of well known alkyl or aryl metal initiators. Suitable initiators include alkyllithium compounds such as n-butyl lithium, n-pentyl lithium, and other alkyl lithium compounds, sodium naphthalene, potassium naphthalene and so forth. A preferred anionic polymerization catalyst is n-butyl lithium. The reaction proceeds rapidly with the generation of relatively large amounts of heat. For example, polymerization rates exceeding 50 percent conversion of monomer per minute initially may be readily achieved using the aforementioned process of anionic polymerization. The polymerization rates may be moderated and accelerated by the addition of certain additives such as polar compounds including ethers such as crown ethers, tertiary amines, and other adjuvants.

Additional components that may be added to the reaction mixture include inert compositions or fillers such as inorganic compounds, structural reinforcing agents, additional elastomeric impact modifiers, foaming agents, lubricity additives, antioxidants, colorants, and other additives useful in improving the final product properties. Examples include calcium carbonate, clays, roving, chopped fiberglass, mineral oil, brominated organic compounds, antimony trioxide. etc. The additives must be selected so as not to interfere with the polymerization process especially an initiator if one is employed. Additives known to improve anionic polymerization processes also may be added, for example, crown ethers may be added to assist the anionic polymerization of styrene as is previously known.

In the process, the vinyl aromatic monomer containing, in addition, the dispersed particulated semicrystalline nonmiscible polymer and, optionally, initiator, dissolved prepolymer, and other additives is thoroughly mixed and the mixture is charged to a polymerization mold. The viscosity of the reaction mixture may be adjusted in order to assist in proper and complete filling of the mold volume. Increased viscosity is obtained by the use of increased amounts of soluble polymer or the use of a higher molecular weight soluble polymer. For example, in the polymerization of styrene monomer, the use of higher molecular weight polystyrene or increased amounts thereof will further increase the viscosity of the reaction mixture.

As is known in the art, the characteristics of the mold and, in particular, the thickness of the molded specimen play an important part in the maximum temperature reached during the mold polymerization process. Generally, with a metal mold and a molded article of less than about ½ centimeter thickness, a temperature rise of about 30° to 100° C. is observed. The temperature rise has been found to affect the quantity of microvoid nucleator and also prepolymer used in the present invention. In the case where small relatively thin objects are molded, relatively small quantities of microvoid nucleator material and prepolymer may be employed. Generally, amounts up to about 50 percent by weight based on total composition of either microvoid nucleator or prepolymer may be employed. Preferably, from about 10 percent to about 45 percent by weight of either component may be employed.

The use of particulated semicrystalline nonmiscible polymer according to the invention has been found to provide beneficial properties in that the formation of large voids and consequent separation of the molded object from the mold surface is greatly reduced by the presence of such particulated polyolefins. It is believed that the formation of microvoids in and around the particulated nonmiscible polymer occurs in preference to formation of macrovoids in or at the interface between the mold and the molded object, thereby reducing cavitation and separation of the molded object from the mold walls.

SPECIFIC EMBODIMENTS

The following examples are provided in further illustration of the present invention but are not to be construed as limiting. In the following examples, percentages are provided as percent by weight.

EXAMPLE 1

Styrene monomer is passed through a bed of activated alumina powder to remove impurities such as oxidation products, moisture and inhibitors. Polystyrene, Styron ® 686 available from The Dow Chemical Company, is added in an amount of 13 percent. Divinylbenzene, similarly purified, 2 percent by weight, is additionally added. The resulting mixture is stirred until solution is achieved. To 200 ml of the monomerpolystyrene solution, there are added 60 grams of high density polyethylene powder having an average particle size of about 70 microns. The resulting slurry is devolatilized to remove entrained or dissolved gases. n-Butyllithium (3 ml, 1.5 normal in hexane solution) is rapidly added with stirring over a 50 second time period. The resulting reaction mixture is then poured into a 250 ml test tube and allowed to polymerize. Polymerization begins within 120 seconds of initiator addition and is completed about 20 seconds thereafter. After cooling, the orange-red polymer is removed from the test tube. The molded object has a surface which is smooth, glossy, free from defects and replicating the test tube inner surface in every respect. The orange-red color slowly fades upon exposure to oxygen and moisture in the atmosphere.

EXAMPLE 2

The reaction conditions of Example 1 are substantially repeated. Moldings about 15 centimeters square and 3 millimeters thick are prepared for use in the preparation of test specimens. The moldings are cut and shaped into test specimens for a variety of physical tests further indicated in Table I. Also shown in Table I for comparison purposes are test results for a good quality compression molded thermoplastic polystyrene (Styron ® 685D available from The Dow Chemical Company). Results of testing are contained in Table I. It is seen that densities substantially less than those of polystyrene are obtained without substantial loss of Izod Impact. Tensile modulus and tensile strength are somewhat reduced due to the presence of microvoids and the particulated polyethylene in the polystyrene molded object.

TABLE I

| Properties | Polymerized in Mold Polymerization | Comparative |
|---|---|---|
| Izod Impact ft lb/in | 0.21 | 0.25 |
| Tensile Mod. lbs/in$^2$ × 10$^{-5}$ | 3.26 | 4.70 |
| Tensile Strength lbs/in$^2$ | 3895 | 6400 |
| % Elongation | 1.5 | 1.5 |
| Vicat °T | 103 | 108 |
| Density lbs/ft$^3$ | 0.874 | 1.040 |

What is claimed is:

1. A composition of matter for use in polymerization in-mold processes under anionic polymerization conditions consisting essentially of a polymerizable vinyl aromatic monomer, an anionic polymerization initiator, an effective amount to reduce cavity formation in the molded object, up to about 50 percent total composition weight of a particulated semicrystalline nonmiscible polymer that is nonreactive in the polymerization process and prepolymerized homopolymer of a vinyl aromatic monomer.

2. A composition according to claim 1 wherein the polymerizable vinyl aromatic monomer is styrene.

3. A composition according to claim 1 wherein the semicrystalline nonmiscible polymer has a number average particle size of less than about 100 micrometers.

4. A composition according to claim 3 wherein the semicrystalline nonmiscible polymer has a number average particle size of less than about 75 microns.

5. A composition according to claim 1 wherein the semicrystalline nonmiscible polymer has a melting point greater than about 90° C.

6. A composition according to claim 5 wherein the semicrystalline nonmiscible polymer has a melting point from about 100° C. to about 160° C.

7. A composition according to claim 1 wherein the nonmiscible polymer is a polyolefin.

8. A composition according to claim 4 wherein the polyolefin is high density polyethylene.

9. A composition according to claim 1 comprising from about 10 to about 50 percent particulated, semicrystalline, nonmiscible polymer.

10. A composition according to claim 2 wherein the vinyl aromatic monomer is styrene and the miscible polymer is polystyrene.

11. A composition according to claim 10 wherein the polystyrene has a molecular weight of from about 500 to about 300,000.

12. A composition according to claim 1 wherein the amounts of nonmiscible polymer and prepolymerized homopolymer are each in the range of from about 10 percent to about 45 percent based on total composition weight.

13. A process for preparing a molded object by in-mold anionic polymerization of a vinyl aromatic monomer comprising:
(a) charging a mold with a reaction mixture consisting essentially of a polymerizable vinyl aromatic monomer, an anionic polymerization initiator, an effective amount to reduce cavity formation in the molded object, up to about 50 percent total composition weight of a particulated, semicrystalline, nonmiscible polymer that is nonreactive in the polymerization process and prepolymerized homopolymer of a vinyl aromatic monomer; and
(b) polymerizing the reaction mixture.

14. A process according to claim 13 wherein the polymerizable vinyl aromatic monomer is styrene.

15. A process according to claim 13 wherein the semicrystalline, nonmiscible polymer is a polyolefin.

16. A process according to claim 13 wherein the semicrystalline, nonmiscible polymer has a melting point greater than about 90° C.

17. A process according to claim 16 wherein the semicrystalline, nonmiscible polymer is high density polyethylene.

18. A molded object prepared by the process of claim 13.

19. A composition according to claim 1 additionally including a crosslinking agent.

20. A composition according to claim 1 additionally including an anionic polymerization improver.

* * * * *